Sept. 13, 1949.  S. S. KNOX  2,481,600
OPTICAL INSTRUMENT FOR USE IN AIRCRAFT
FOR VISUALLY SYNCHRONIZING THE LANDING
WHEELS AND GROUND MOVEMENT
Filed July 6, 1945  2 Sheets-Sheet 1
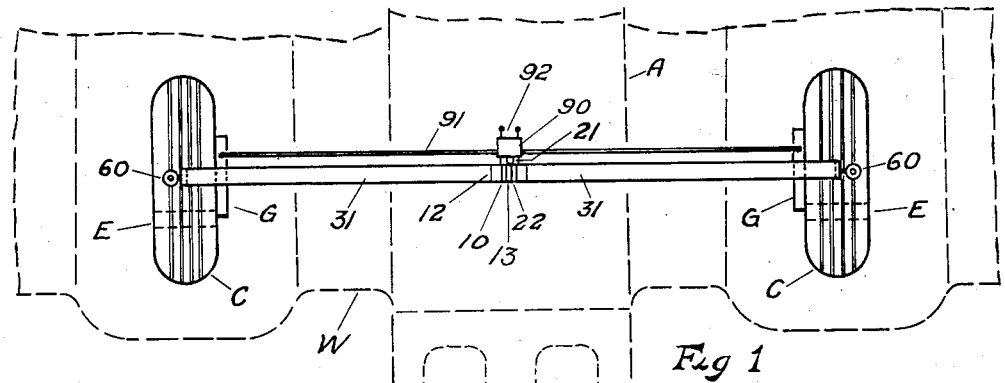
Fig 1
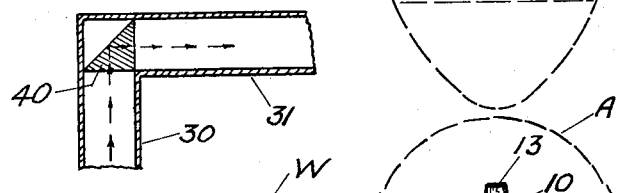
Fig 3
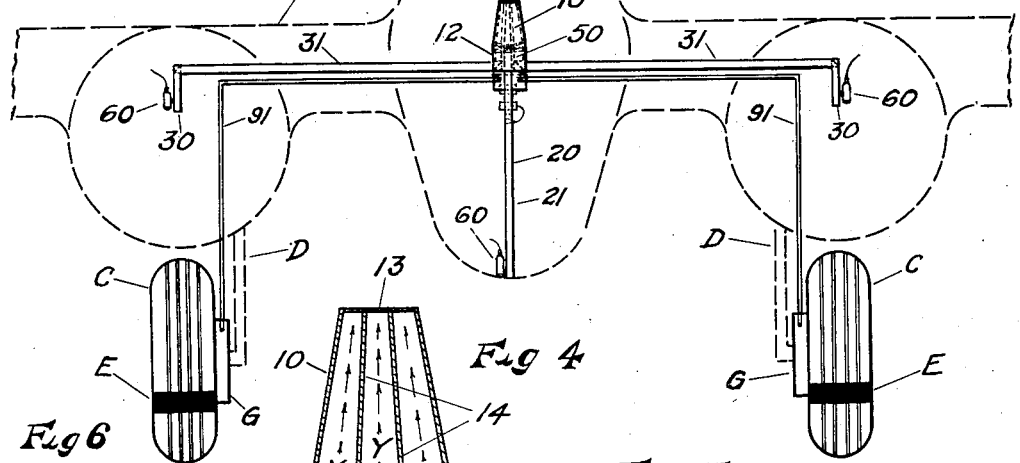
Fig 2
Fig 4
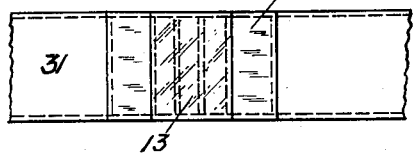
Fig 5
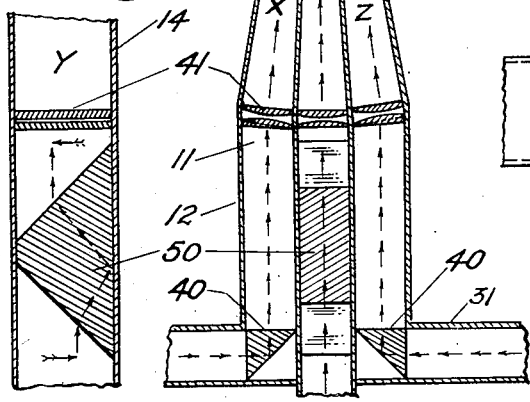
Fig 6
INVENTOR.
Samuel S. Knox Sept. 13, 1949. S. S. KNOX 2,481,600
OPTICAL INSTRUMENT FOR USE IN AIRCRAFT
FOR VISUALLY SYNCHRONIZING THE LANDING
WHEELS AND GROUND MOVEMENT
Filed July 6, 1945 2 Sheets-Sheet 2
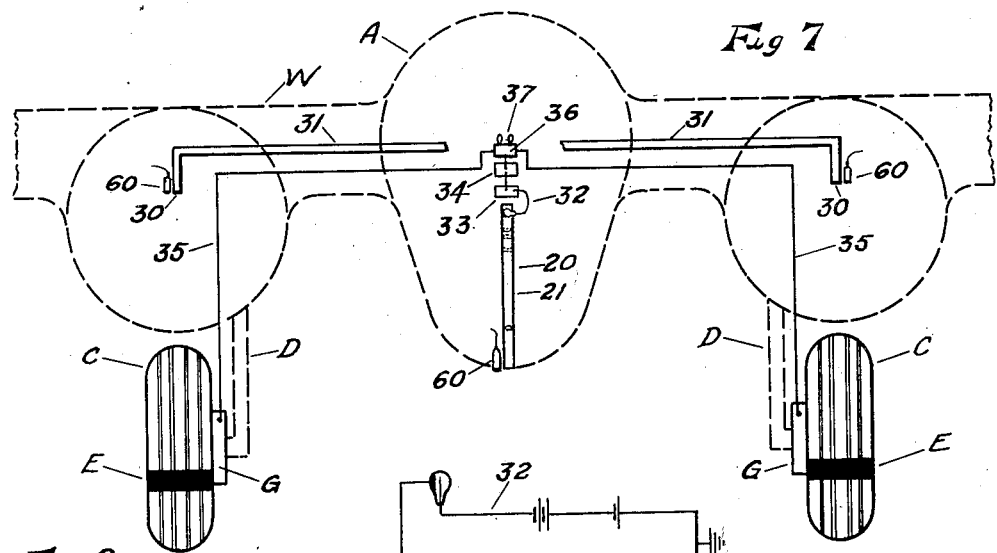
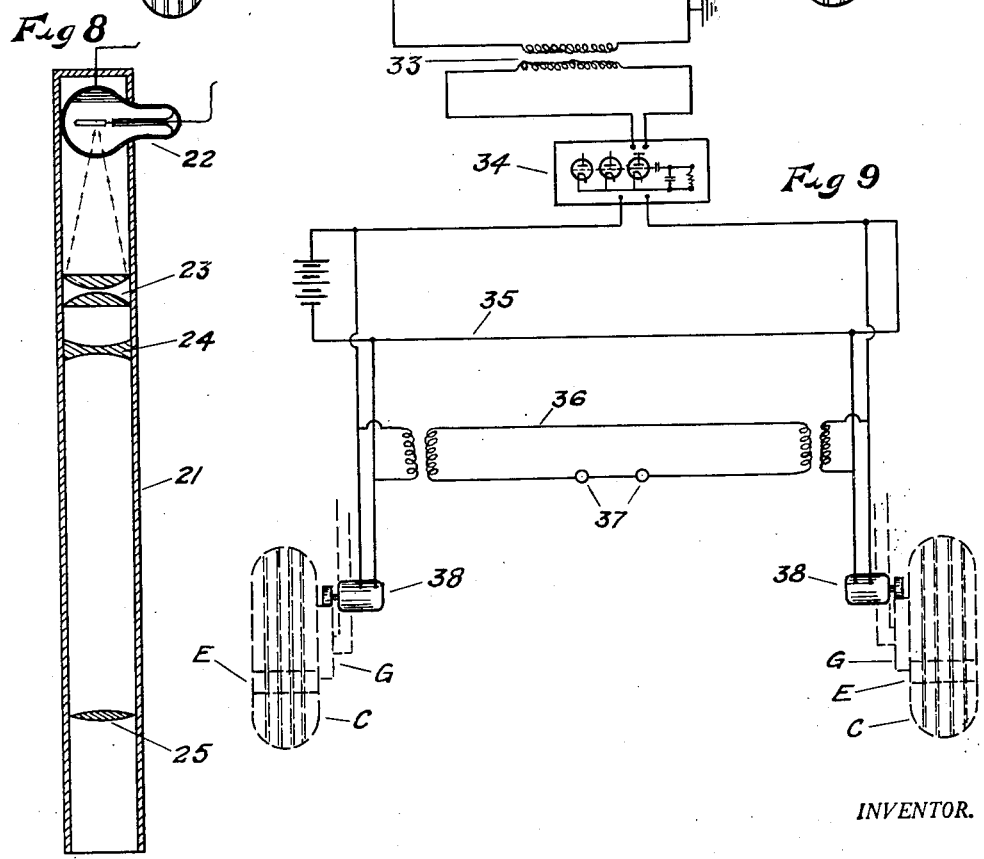
INVENTOR.
Samuel S. Knox

Patented Sept. 13, 1949

2,481,600

UNITED STATES PATENT OFFICE 2,481,600

OPTICAL INSTRUMENT FOR USE IN AIRCRAFT FOR VISUALLY SYNCHRONIZING THE LANDING WHEELS AND GROUND MOVEMENT

Samuel S. Knox, Long Beach, Calif.

Application July 6, 1945, Serial No. 603,450

6 Claims. (Cl. 88—1)

This invention has to do with an aircraft instrument and is more specifically concerned with an instrument or unit of apparatus for indicating the operative relationship between the ground and the landing wheels of an aeroplane, and it is a general object of the present invention to provide a simple, practical, effective instrument of this general character.

Certain structures in this application are shown in my prior Patent No. 2,413,924, dated January 7, 1947.

This instrument is intended for use only on large aeroplanes that carry a pilot, copilot and flight engineer as part of their crew.

In landing aeroplanes, and particularly when handling large aeroplanes, difficulties are frequently encountered when there is a substantial difference between the rotational speed of the treads of the landing wheels and the movement of the plane over the ground, commonly termed the ground speed.

To facilitate landing various means have been proposed and used to effect pre-rotation of the landing wheels of planes so that the rotational speeds of the peripheries of the wheels are substantially equal to the ground speed or to the speed of movement of the plane relative to the ground. Even with such pre-rotation of the landing wheels difficulties are experienced due to differences in speed between the several landing wheels, and due to the fact that it is practically impossible to gain exactly the same speed between the wheels and the ground. Reliance of a pilot upon pre-rotation is very likely to cause difficulty, whereas if the pilot is fully apprized of the lack of synchronism in the various factors involved he is prepared to handle the aeroplane accordingly.

It is a general object of my present invention to provide an instrument whereby the wheel and ground speed may be observed and compared, and where power drive is employed to rotate the wheels, be synchronized with each other, thus making easier a safe and proper landing. With the knowledge gained from the instrument I have provided the shock of landing can be minimized, making landings safe and making it possible to lighten plane construction.

It is another object of my invention to provide apparatus such as I have referred to which is an optical instrument, or in which the factors are communicated to the observer visually, making it unnecessary for him to read or compare instruments or indicators, such as speedometers or other like devices.

Another object of the invention is to provide an instrument of the general character hereinabove referred to which is wholly free of mechanically moving or operating parts complicated or expensive of manufacture or subject to failure. The instrument that I have provided involves elements that are extremely simple and inexpensive of manufacture and when once installed are not subject to improper operation.

Another object of my invention is to provide a visual or optical instrument of the general character hereinabove referred to, operable at night as well as during the day. My invention provides illuminating means making the instrument useful even though the parts to be viewed are not illuminated by daylight.

Another object of my invention is to provide a means by which the synchronizing controls may be operated entirely automatically. This automatic control will operate at night as well as during the day.

The various objects and features of my invention will be fully understood from the following detailed description of a typical preferred form and application of the invention, throughout which description reference is made to the accompanying drawings, in which:

Fig. 1 is a plan view of a typical unit of apparatus embodying the present invention, showing the manner in which such unit is related to a typical aeroplane. Fig. 2 is a front end view of the visual apparatus of the present invention likewise indicating its application to a typical aeroplane. Fig. 3 is an enlarged detailed sectional view of one portion of the apparatus that I have provided. Fig. 4 is a detailed sectional view showing a vertical cross section of part 13 taken on the transverse center line. Fig. 5 is a plan view of Fig. 4. Fig. 6 is a sectional view taken on the vertical center line of the lower part of Fig. 4.

Fig. 7 is a front end view of the automatic synchronizing apparatus, shown symbolically, of the present invention likewise indicating its application to a typical aeroplane.

Fig. 8 is a sectional view of the viewing tube used for automatic control.

Fig. 9 shows symbolically one of the many electrical circuits that may be used to synchronize wheel and ground speed automatically.

For automatic control it will be necessary to adopt a standard sized tire, then on the landing strip and the approach to the landing strip for a suitable distance, reference lines are drawn so that they form an angle of 90° with the center line of the landing strip.

The reference lines may be formed on the surface of the landing strip in any suitable manner so long as they optically differentiate from the background or balance of the field. These reference lines must be spaced apart a distance exactly equal to the circumference of the tire.

When an aeroplane equipped with the automatic synchronizing apparatus shown in Fig. 7, Fig. 8, and Fig. 9 approaches the landing strip with its wheels C lowered to their landing position, the telescopic viewing tube 21 shown in Fig. 8, cuts across a given number of reference lines per second. As each mark is passed over a flash of light will occur on the sensitized plate of the photo-electric cell 22. This will cause a current to flow in the photo-electric cell circuit 32. This current will be amplified by the amplifier 33, and synchronized and passing through a suitably geared electric motor 38 will cause each wheel C to make one complete revolution. Therefore, we get one revolution of the wheels each time a reference line is passed over and when the wheels touch the runway they will be turning at exactly ground speed.

I show two synchronizing devices in this circuit, one 34 to synchronize the power circuit 35 with the photo-electric circuit 32 and the other 36 to synchronize the wheels C with each other. This is desirable as one wheel may turn less freely than the other due to a dragging brake or other mechanical trouble. The lamps 37 will be dark when the wheels are synchronized with each other.

Referring in detail to Fig. 8, the lenses 24 and 25 form a Galilean type of telescope. This type of telescope gives a good enlargement of a small field of vision. This is desirable as it is necessary to see but one reference line at a time just prior to landing. The condensing lens 23 is placed where the image is formed and a bright light will be focused on the sensitized plate of the photo-electric cell 22.

In Fig. 1, Fig. 2 and Fig. 7 the wide stripes across the treads of the tires are for the purpose of facilitating the visual and manual controlled synchronization of the wheels with ground speed over landing strips that have been cross lined for automatic control, when it is preferable to use the manual control.

The instrument that I have provided is useful, generally, on aircraft to facilitate the landing thereof. The invention is particularly useful on aeroplanes or heavier than air craft which have to be landed at high speeds. In the drawings I have shown two simple typical forms of the invention and have indicated such forms of the invention as applied to a typical aeroplane. The aeroplane indicated in the drawings includes a fuselage A with a pilot's compartment at B, landing wheels C located beneath wing W in opposite directions from or at either side of the fuselage, the wheels C being carried by a suitable supporting gear D so that they are retractable and so that they are spaced a substantial distance apart laterally of the plane when lowered to be in operating position, as shown in Fig. 2 and Fig. 7 of the drawings.

The instrument that I have provided involves, generally, what I will term a viewing device 10 located so that it can be readily observed, and means 11 for projecting images of several different objects into the viewing device to be there visible in side by side relationship for immediate comparison.

In large aeroplanes that carry a pilot, a co-pilot and a flight engineer, the viewing device can be placed so that it will be operated by the flight engineer at times when not on automatic control.

In practice the essential elements of the invention will vary with the number and location of the objects to be viewed and with the structure of the aeroplane in which the instrument is incorporated. In an ordinary situation such as I have illustrated in the drawings the observer utilizing the information is supplied with the desired information when supplied with a view of each of the two wheels C and the ground over which the aeroplane is traveling. In this particular case the viewing device is such as to provide three images to be viewed by the observer and there are three separate parts to the means 11, one for projecting an image of the ground over which the plane is operating and one for projecting an image of each wheel C.

The particular viewing device shown in the drawings involves, generally, a case 12, tubular in form and provided at its upper end with a screen or ground glass 13. The tubular case is provided with partitions 14 which extend longitudinally therein and divide the case into three light ducts or passages X, Y and Z. The light ducts extend from the lower end of the case to the upper end where they are open to the ground glass 13.

Each of these several separate parts of the means 10 includes a light conveying tube 20 having one end facing an object to be viewed and the other end facing one of the light ducts of the means 10. The light conveying tubes 20 will, in practice, vary in shape and extent depending upon the relationship of the means 10 to the parts to be viewed. In the particular case illustrated, which is a typical case, the tube 20 of one part of means 11 designed to face the ground over which the plane is operated, may be a straight tube extending downwardly from one of the light ducts of means 10, preferably the center light duct Y of the means 10, as shown in Fig. 2 of the drawings. This light conveying tube 20 is joined to the case 12 of means 10 and is open at each end and is free of obstructions so that light reflected from the ground over which the plane is traveling enters the open lower end of the tube and passes upwardly through the tube to be passed therefrom into the duct Y in case 12.

In the arrangement illustrated the viewing device 10 is located between the wheels C. Each light conveying tube provided for receiving light from a wheel C has an outer end portion 30 which is vertically disposed over the wheel, a horizontal and inwardly extending lateral portion 31 which joins the upper end of the portion 30 and extends to a point near the center of the aeroplane. The outer portion 30 of each tube is preferably located to point to or to face the center of the wheel at which it is located. The lateral portions 31 being connected at their inner ends to the case 12 of means 10, the said portion of one such light conveying tube communicating with duct X while the said portion of the other light conveying tube communicates with duct Z.

I provide reflectors 40 at the corners where the light conveying tube portions join so that light entering the lower ends of the tube portions 30 is reflected through the several portions of the tubes to enter the ducts X and Z.

The means 11 includes in addition to the tubes hereinabove described a condensing lens 41 in connection with each tube, preferably where it joins a duct of the case 10, the several lenses being such as to receive images from the tubes and throw or project them through the ducts of case 12 onto the ground glass 13.

The back or lower face of parts 41 in the outer light ducts X and Z are ground at a slight angle such that the refraction of the glass will bend the light rays passing through the lens enough to give the proper direction to the projected image on the ground glass 13.

It is to be understood that the tubes or various light conveying parts may, in practice, be of any desired shape or cross sectional configuration. In the preferred form of the invention the several tubes of the means 11 may be made fairly large in cross sectional extent to pass a substantial amount of light, and it may not be desirable to cast images on the ground glass as large as the cross sectional areas of the tubes. In such case the case 12 may be made tapered or convergent so that the end where the ground glass is located is substantially smaller than the end to which the several tubes of means 11 are joined, and the lenses 41 provided in the means 11 may be designed to cast images of the desired size on the ground glass 13.

In practice it is necessary that the movements indicated on the ground glass 13, that is the images of the wheels and of the ground, should appear to be in the same direction so that the pilot can readily compare them. To accomplish this when the arrangement is such as I have shown in the drawings I provide a reversing prism 50 in the tube passing the image of the ground so that this image is reversed as otherwise it would be moving in a direction opposite to that of the wheels.

In accordance with the preferred form of my invention I provide a source of light, preferably a small spotlight, 60 at or near the outer end of each of the tubes 30 and lower end of tube 20 of means 11 and the lights are focused and directed so that when they are energized they shine brightly upon the spot from which light is desired to be reflected into the tubes. For instance the light on the center tube which faces the ground shines downwardly onto the ground immediately under that tube, whereas the other lights shine onto the wheels C immediately under or in line with the light conveying tubes facing the wheels.

In the drawings I have indicated a pre-rotating unit G at each landing wheel and have shown a control 90 in the aeroplane adjacent the viewing unit 10. I have indicated the control 90 coupled with each unit G by a suitable control connection 91 and have shown individual control levers 92 at the control 90 so that the wheels can be individually controlled.

It will be apparent from the foregoing description that the apparatus may be made wholly automatic, that is, through electronic means or other suitable means such as the electric synchronizing circuit shown in Fig. 9, flashing effect of the viewing device can be utilized as the means or medium for effecting adjustment of the pre-rotation units. For instance, an electronic unit or units can be provided to operate under control of the flashes to regulate the pre-rotation units so that the pre-rotating means are automatically adjusted so that the wheels of the aeroplane are operating in true synchronism with the ground speed when the aeroplane reaches the ground.

With the apparatus that I have provided light from the several objects, that is, from the two wheels C and from the surface of the landing field immediately under the plane, is reflected through the tubes of the means 11 and is directed between lenses 41 so that several images are thrown on the ground glass 13. These several images, characterized by the flashes or flash-like effect gained by the provision of the reference marks on the field and wheels, give the observer a view of the objects to which the tubes of the means 11 are faced.

From the foregoing description it will be apparent that I have provided an optical instrument which is entirely free of working or moving parts subject to failure or which are heavy and complicated. The apparatus that I have provided, when once properly installed, remains static and is at all times available for use. Further, it is important that the instrument that I have provided is wholly optical and is such that it can be read instantaneously and does not have to be compared with numerous dials or instrument readings in order to ascertain the information desired.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. In an airplane including landing wheels, having controlled power means to drive said wheels at the desired speed of rotation, means to synchronize the movement of the wheels and the ground motion relative to the airplane, a viewing device having a ground glass, positioned at a control point of the airplane, means to project images of the landing wheels and the ground on the ground glass for simultaneous viewing and comparison, said last named means including a tube to pass light for each image and a projecting lens throwing an image from the tube to the viewing device.

2. In an airplane including landing wheels, having controlled power means to drive said wheels at the desired speed of rotation, a viewing device having a ground glass, positioned at a control point of the airplane means for projecting images of the periphery of the rotating landing wheels and of the ground on the ground glass for simultaneous viewing and comparison, said projecting means including means for causing said movement of the images of the periphery of the wheels and of the ground to be in the same direction, whereby the apparent movement of the periphery of the wheels and of the ground may be synchronized to thereby aid in the landing of the airplane.

3. In an airplane including landing wheels, having controlled power means to drive said wheels at the desired speed of rotation, a viewing device having a ground glass, positioned at a control point of the airplane means for projecting images of the periphery of the rotating landing wheels and of the ground on the ground glass for simultaneous viewing and comparison, said projecting means including means for causing said movement of the images of the periphery of the wheels and of the ground to be in the same direction, whereby the apparent movement of the periphery of the wheels and of the ground may be synchronized to thereby aid in the landing of the airplane, and means to illuminate the landing wheels and the ground.

4. In an airplane including landing wheels, having controlled power means to drive said wheels at the desired speed of rotation, a viewing device having a ground glass, positioned at a control point of the airplane means for projecting images of the periphery of the rotating landing wheels and of the ground on the ground glass for simultaneous viewing and comparison, said projecting means including means for causing said movement of the images of the periphery of the wheels and of the ground to be in the same direction, whereby the apparent movement of the periphery of the wheels and of the ground may be synchronized to thereby aid in the landing of the airplane, and means to illuminate the landing wheels and the ground, said illuminating means including a light adjacent to the lower ends of the viewing device.

5. In an airplane including landing wheels, having controlled power means to drive said wheels at the desired speed of rotation, the speed of the wheels being synchronous with the apparent ground motion, a reference mark on the periphery of each landing wheel, an optical viewing device having a ground glass positioned at a control point of the airplane and observable from within the airplane means for projecting images of the periphery of the rotating landing wheels and of the ground on the ground glass for simultaneous viewing and comparison, said projecting means including means for causing said movement of the images of the periphery of the wheels and of the ground to be in the same direction, whereby the apparent movement of the periphery of the wheels and of the ground may be synchronized to thereby aid in the landing of the airplane.

6. In an airplane including landing wheels, having controlled power means to drive said wheels at the desired speed of rotation, the speed of the wheels being synchronous with the apparent ground motion, a reference mark on the periphery of each landing wheel, an optical viewing device having a ground glass positioned at a control point of the airplane and observable from within the airplane means for projecting images of the periphery of the rotating landing wheels and of the ground on the ground glass for simultaneous viewing and comparison, the viewing device including a tube for passing light for each image, a reversing prism and a projecting lens directing an image on to the ground glass, whereby the images of the periphery of the wheels and of the ground appear to move in the same direction, whereby the apparent movement of the periphery of the wheels and of the ground may be synchronized to thereby aid in the landing of the airplane.

SAMUEL S. KNOX.

REFERENCES CITED

The following references are of record in the file of this patent:

UNITED STATES PATENTS

| Number | Name | Date |
|---|---|---|
| 1,142,274 | Routin | June 8, 1915 |
| 1,509,167 | Morse | Sept. 23, 1924 |
| 1,573,333 | Stoller | Feb. 16, 1926 |
| 1,745,933 | Kauch et al. | Feb. 4, 1930 |
| 1,963,826 | Chilton | June 19, 1934 |
| 2,019,234 | Nistri | Oct. 29, 1935 |
| 2,153,718 | Kitroser | Apr. 11, 1939 |
| 2,347,986 | Bowerman | May 2, 1944 |
| 2,353,380 | Adler | July 11, 1944 |
| 2,399,676 | Holschuh et al. | May 7, 1946 |
| 2,413,924 | Knox | Jan. 7, 1947 |

FOREIGN PATENTS

| Number | Country | Date |
|---|---|---|
| 640,839 | France | Apr. 7, 1928 |